(12) United States Patent
Ni et al.

(10) Patent No.: US 8,475,943 B2
(45) Date of Patent: Jul. 2, 2013

(54) COATED ARTICLE HAVING YTTRIUM-CONTAINING COATINGS APPLIED BY PHYSICAL VAPOR DEPOSITION AND METHOD FOR MAKING THE SAME

(75) Inventors: Wangyang Ni, Parsippany, NJ (US); Ronald M Penich, Greensburg, PA (US); Yixiong Liu, Greensburg, PA (US)

(73) Assignee: Kennametal Inc., Latrobe, PA (US)

(*) Notice: Subject to any disclaimer, the term of this patent is extended or adjusted under 35 U.S.C. 154(b) by 0 days.

(21) Appl. No.: 13/178,564

(22) Filed: Jul. 8, 2011

(65) Prior Publication Data

US 2013/0011692 A1    Jan. 10, 2013

(51) Int. Cl.
*B32B 9/00* (2006.01)

(52) U.S. Cl.
USPC ............................ 428/697; 428/698; 428/699

(58) Field of Classification Search
USPC .......................................... 428/697, 698, 699
See application file for complete search history.

(56) References Cited

U.S. PATENT DOCUMENTS

| | | | | |
|---|---|---|---|---|
| 4,965,140 A * | 10/1990 | Sarin | ............................. | 428/698 |
| 5,286,443 A * | 2/1994 | Nazmy et al. | .................. | 420/418 |
| 6,033,768 A | 3/2000 | Muenz et al. | | |
| 6,620,491 B2 * | 9/2003 | Kukino et al. | ................. | 428/697 |
| 6,623,850 B2 * | 9/2003 | Kukino et al. | ................. | 428/699 |
| 7,217,466 B2 * | 5/2007 | Weber et al. | ................... | 428/697 |
| 7,541,101 B2 * | 6/2009 | Weber | ............................ | 428/698 |
| 7,811,683 B2 * | 10/2010 | Zhu et al. | ....................... | 428/697 |
| 7,989,093 B2 * | 8/2011 | Myrtveit | ........................ | 428/697 |
| 8,017,226 B2 * | 9/2011 | Yamamoto | ..................... | 428/699 |
| 8,025,956 B2 * | 9/2011 | Yamamoto et al. | ........... | 428/697 |
| 8,025,958 B2 * | 9/2011 | Yamamoto et al. | ........... | 428/698 |
| 8,236,411 B2 * | 8/2012 | Waki et al. | ..................... | 428/698 |
| 2006/0099455 A1 | 5/2006 | Leyens et al. | | |
| 2008/0075543 A1 | 3/2008 | Zhu et al. | | |
| 2010/0129168 A1 | 5/2010 | Waki et al. | | |

FOREIGN PATENT DOCUMENTS

| | | | |
|---|---|---|---|
| JP | 09-323204 | * | 12/1997 |
| JP | 11-131215 | * | 5/1999 |
| JP | 2000-326108 | * | 11/2000 |
| JP | 2005319568 A | | 11/2005 |

(Continued)

OTHER PUBLICATIONS

Lewis et al "The influence of the yttrium content on the structure and properties of Ti(1-x-y-z)Al(x)Cr(y)Y(z)N PVD hard coatings" Surface & Coating Tech 114 (1999) p. 187-199.*

(Continued)

*Primary Examiner* — Archene Turner
(74) *Attorney, Agent, or Firm* — Matthew W. Gordon, Esq.

(57) ABSTRACT

A coated article has a substrate and a coating scheme, which has a PVD coating region. The PVD coating region contains aluminum, yttrium, nitrogen and at least one element selected from the group of titanium, zirconium, hafnium, vanadium, niobium, tantalum, chromium, molybdenum, tungsten and silicon. The sum of the aluminum and yttrium contents is between about 3 atomic percent and about 55 atomic percent of the sum of aluminum, yttrium and the other elements. The yttrium content is between about 0.5 atomic percent and about 5 atomic percent of the sum of aluminum, yttrium and the other elements. There is also a method of making the coated article that includes steps of providing the substrate and depositing the above coating scheme with the PVD coating region.

15 Claims, 8 Drawing Sheets

FOREIGN PATENT DOCUMENTS

| | | |
|---|---|---|
| JP | 2005319570 A | 11/2005 |
| JP | 2006281408 A | 10/2006 |
| JP | 2008137130 A | 6/2008 |
| JP | 2009101475 A | 5/2009 |
| JP | 2009119551 A | 6/2009 |
| WO | 2009110829 A1 | 9/2009 |

OTHER PUBLICATIONS

Mattox, "Handbook of Physical Vapor Deposition (PVD) Processing", Society of Vacuum Coaters, (1998) pp. 3-4.

* cited by examiner

COATED ARTICLE HAVING YTTRIUM-CONTAINING COATINGS APPLIED BY PHYSICAL VAPOR DEPOSITION AND METHOD FOR MAKING THE SAME

BACKGROUND OF THE INVENTION

The invention pertains to a coated article wherein the coated article comprises a substrate and a coating scheme on the substrate. These coated articles are useful in wear-resistant applications such as, for example without limitation, metal cutting, metal forming and tribological applications to extend the useful life of wear parts. More specifically, the invention pertains to such a coated article wherein the coating scheme includes a PVD coating region. The PVD coating region comprises one or more coating layers applied by physical vapor deposition (PVD) techniques, and wherein at least one coating layer contains yttrium. The coating layer can have a thickness greater than about 100 nanometers, or the coating layer can be without limitation a nanolayer(s) wherein the thickness is less than or equal to about 100 nanometers. The PVD coating region has a high hardness so as to provide suitable wear properties.

Physical Vapor Deposition (PVD) processes (often just called thin film processes) are atomistic deposition processes in which material is vaporized from a solid source in the form of atoms, transported in the form of a vapor through a vacuum or low pressure gaseous (or plasma) environment to the substrate where it condenses. Typically, PVD processes are used to deposit films with thicknesses in the range of a few nanometers to thousands of nanometer; however they can also be used to form multilayer coatings, graded composition deposits, very thick deposits and freestanding structures. PVD processes can be used to deposit films of elements and alloys as well as compounds using reactive deposition processes. In reactive deposition processes, compounds are formed by the reaction of depositing material with the gas environment such as nitrogen (e.g. titanium nitride, TiN). See Donald M. Mattox, *Handbook of Physical Vapor Deposition (PVD) Processing*, Society of Vacuum Coaters, Albuquerque, N. Mex. (1998), pp. 3-4.

Commercial coated products that have a PVD hard coating layer thereon are known. Table 1 below sets forth the chemistry, hardness, and other properties.

TABLE 1

Properties of Commercially Known PVD Coatings on Coated Cutting Inserts

| Coating Name | Chemistry | Layers | Hardness (GPa) | Young's Modulus (GPa) |
|---|---|---|---|---|
| TiN | TiN | single coating layer | 24.8 | 551 |
| TiN/TiCN multi | TiN/TiCN | multiple sets of alternating coating layers of TiN and TiCN | 30.1 | 545 |
| TiAlN | (Ti55 at % Al45 at %)N | single coating layer | 27.6 | 552 |
| TiN/AlTiN | (Ti60 at % Al40 at %)N | multiple sets of alternating coating layers of TiN and AlTiN | 28.5 | 541 |
| AlTiN | (Ti37 at % Al63 at %)N | single coating layer | 25.2 | 359 |
| AlCrN | (Cr37 at % Al63 at %)N | single coating layer | 29.4 | 514 |

In Table I, the chemistry of the overall coating scheme is set forth in atomic percent of the elements, except for nitrogen. The hardness and Young's Modulus are set forth in GPa (gigapascals) and were measured by a nanoindentation technique. Specifically, the hardness and Young's Modulus were obtained using the nanoindentation technique per ISO 14577-1 standard procedure with the indentation set at 0.25 microns.

In the context of metal cutting applications and all other things being equal, a coating layer with a higher hardness typically increases the useful tool life of the coated cutting insert, and a lower hardness typically decreases the useful tool life of the coated cutting insert. This correlation also appears to be true for metal forming and tribological applications (e.g., wear parts).

U.S. Pat. No. 6,033,768 to Muenz et al. pertains to a hard material for use with cutting tools, especially for use in the coolant-free and lubricant-free machining of metals like die steels or aluminum alloys. According to Muenz et al., yttrium is added in the range of 0.1 to 4.0 atomic percent, preferably in the range of 1.5 to 2.0 atomic percent to ternary TiAlN alloys or in the following multilayer coatings: TiAlN/CrN, TiAlN/ZrN, TiAlN/TiN, TiAlN/MoN, and TiAlN/WN. To achieve the goal, in Muenz et al. the yttrium must be unevenly distributed over the entire hard material layer in the growth direction of the coating. Using what Muenz et al. terms "preferred deposition conditions", the nitride coating composition is 40 at % of titanium, 56 at % of aluminum, 2 at % of yttrium, and 2 at % of chromium.

PCT Published Patent Application WO 2009/110829 to Johansson et al. pertains to a coated cutting tool wherein the coating includes at least one cubic structured layer of $(Ti_{1-(x+z)}Si_xMe_z)N$ wherein $0.04<x<0.20$, and $0<z<0.10$ wherein Me is one or more of Y, Hf, Nb, Ta, Mo, W, Mn, Fe and Zn, preferably Y, Nb, Mo and Fe. United States Published Patent Application No. US 2010/0129168 A1 to Waki et al. pertains to a coating layer that has a first layer and a second layer. The first layer comprises $Ti_{1-a-b-c-d}Al_aW_bSi_cM_d$ $(C_{1-x}N)$ wherein M is at one selected from Nb, Mo, Ta, Hf and Y. The second layer comprises $Ti_{1-e-f-g} Al_eSi_fM'_g(C_{1-x}N)$ wherein M' is at one selected from Nb, Mo, Ta, Hf and Y.

It would highly desirable to provide a coated article that has a hard coating that exhibits improved properties wherein the coated article is useful in wear-resistant applications such as, for example, metal cutting, metal forming, and tribological applications to extend the useful life of wear parts. It would be further highly desirable to provide such a coated article that has a hard coating applied by physical vapor deposition that exhibits such improved properties.

It would be still further highly desirable to provide such a coated article that has a PVD coating region that exhibits improved properties (e.g., a higher hardness) and wherein the PVD coating region contains aluminum and yttrium and nitrogen and at least one element selected from the group of titanium, zirconium, hafnium, vanadium, niobium, tantalum, chromium, molybdenum, tungsten and silicon. It would be still further highly desirable to provide such a coated article that has a PVD coating region that exhibits improved properties (e.g., a smaller grain size) and wherein the PVD coating region contains aluminum and yttrium and nitrogen and at least one element selected from the group of titanium, zirconium, hafnium, vanadium, niobium, tantalum, chromium, molybdenum, tungsten and silicon. It would be still further highly desirable to provide such a coated article that has a PVD coating region that exhibits improved properties and wherein the PVD coating region contains aluminum and yttrium and nitrogen and at least one element selected from the group of titanium, zirconium, hafnium, vanadium, niobium, tantalum, chromium, molybdenum, tungsten and silicon.

SUMMARY OF THE INVENTION

In one form, the invention is a coated article that comprises a substrate, and a coating scheme. The coating scheme comprises a PVD coating region applied by physical vapor deposition wherein the coating region contains aluminum and yttrium and nitrogen and at least one element selected from the group consisting of titanium, zirconium, hafnium, vanadium, niobium, tantalum, chromium, molybdenum, tungsten and silicon. The sum of the aluminum and yttrium contents is between about 3 atomic percent and about 55 atomic percent of the sum of the aluminum, the yttrium and the other elements. The yttrium content is between about 0.5 atomic percent and about 5 atomic percent of the sum of the aluminum, the yttrium and the other elements.

In yet another form thereof, the invention is a method of applying a coating layer to a substrate comprising the steps of: providing a substrate; and depositing a coating scheme on the substrate wherein the coating scheme comprising a PVD coating region deposited by physical vapor deposition. The PVD coating region contains aluminum and yttrium and nitrogen and at least one element selected from the group consisting of titanium, zirconium, hafnium, vanadium, niobium, tantalum, chromium, molybdenum, tungsten and silicon. The sum of the aluminum and yttrium contents is greater than or equal to about 3 atomic percent of the sum of the aluminum, the yttrium and the other elements and less than or equal to about 55 atomic percent of the sum of the aluminum, the yttrium and the other elements. The yttrium content is greater than or equal to about 0.5 atomic percent of the sum of the aluminum, the yttrium and the other elements and less than or equal to about 5 atomic percent of the sum of the aluminum, the yttrium and the other elements.

BRIEF DESCRIPTION OF THE DRAWINGS

The following is a brief description of the drawings that form a part of this patent application.

DETAILED DESCRIPTION

The invention pertains to a coated article wherein the coated article comprises a substrate and a coating scheme. Such coated articles are useful in wear-resistant applications such as, for example and without limitation, metal cutting, metal forming and tribological applications to extend the useful life of wear parts. In the context of the invention, the coating scheme includes a PVD coating region, which comprises one or more coating layers applied by physical vapor deposition (PVD) techniques. The PVD coating region has a high hardness so as to provide suitable wear properties. The coating layers in the PVD coating region can have a thickness between more than about 100 nanometers to about 10 micrometers. The coating layers can also be, without limitation, nanolayers wherein the thickness of each layer is less than about 100 nanometers.

More specifically, the invention pertains to a coated article that comprises a substrate and a coating scheme. The coating scheme comprises a PVD coating region applied by physical vapor deposition wherein the coating region contains aluminum and yttrium and nitrogen and at least one element selected from the group consisting of titanium, zirconium, hafnium, vanadium, niobium, tantalum, chromium, molybdenum, tungsten and silicon. The sum of the aluminum and yttrium contents is between about 3 atomic percent and about 55 atomic percent of the sum of the aluminum, the yttrium and the other elements, except for nitrogen. The yttrium content is between about 0.5 atomic percent and about 5 atomic percent of the sum of the aluminum, the yttrium and the other elements, except for nitrogen.

In reference to the method, the invention pertains to a method of applying a coating layer to a substrate comprising the steps of: providing a substrate; and depositing a coating scheme on the substrate wherein the coating scheme comprising a PVD coating region deposited by physical vapor deposition; and the PVD coating region containing aluminum and yttrium and nitrogen and at least one element selected from the group consisting of titanium, zirconium, hafnium, vanadium, niobium, tantalum, chromium, molybdenum, tungsten and silicon; and wherein the sum of the aluminum and yttrium contents being greater than or equal to about 3 atomic percent of the sum of the aluminum, the yttrium and the other elements and less than or equal to about 55 atomic percent of the sum of the aluminum, the yttrium and the other elements, except for nitrogen, and the yttrium content being greater than or equal to about 0.5 atomic percent of the sum of the aluminum, the yttrium and the other elements and less than or equal to about 5 atomic percent of the sum of the aluminum, the yttrium and the other elements, except for nitrogen.

Figure 1:
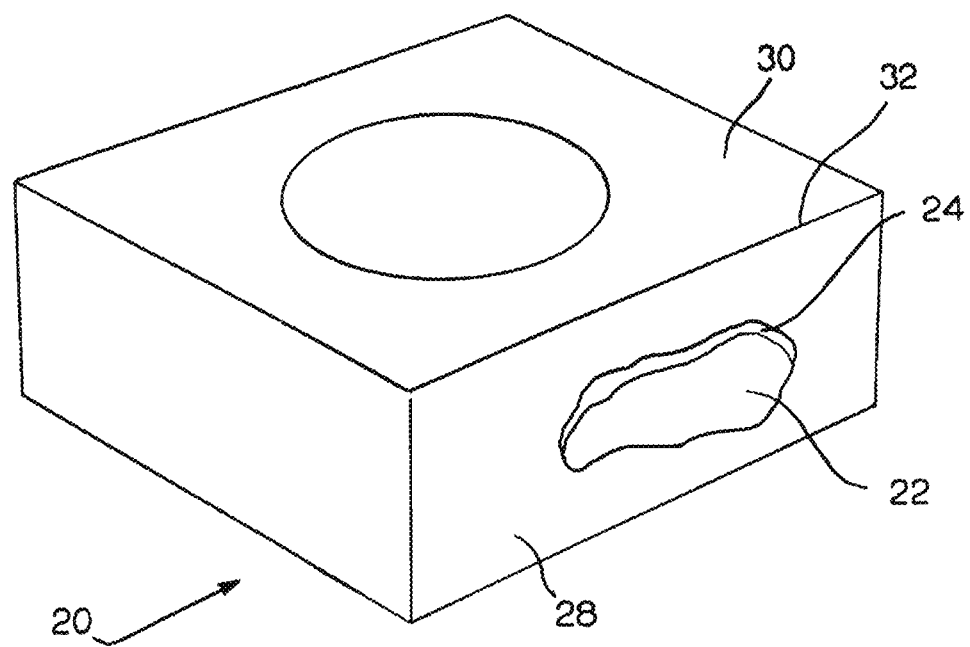
FIG. 1 is an isometric view of a specific embodiment of a cutting insert, which is of a SNMA cutting tool geometry, that has an inventive coating scheme deposited thereon.

Referring to the drawings, FIG. 1 there is shown a coated cutting insert generally designated as 20. The coated cutting insert 20 is of SNMA geometry; yet, the coated cutting insert can take on any suitable geometry. The coated cutting insert 20 has a substrate 22 and a coating scheme 24. The coated cutting insert 20 has flank surfaces 28 and a rake surface 30 wherein a cutting edge 32 is at the juncture of the flank surfaces 28 and the rake surface 30.

As mentioned herein, the PVD coating region contains aluminum and yttrium and nitrogen and at least one element selected from the group of titanium, zirconium, hafnium, vanadium, niobium, tantalum, chromium, molybdenum, tungsten and silicon. The addition of yttrium to the coating results in a reduction of the grain size of the PVD coating region. Typically, reduction in the grain size of the coating layer results in an increase in the hardness according to the Hall-Petch relationship. However, there is a caution that adding yttrium to a coating with a high aluminum content, i.e., an aluminum content greater than about 60 to about 65 atomic percent of the other elements, except for nitrogen, can result in a coating with an amorphous microstructure.

Figure 2:
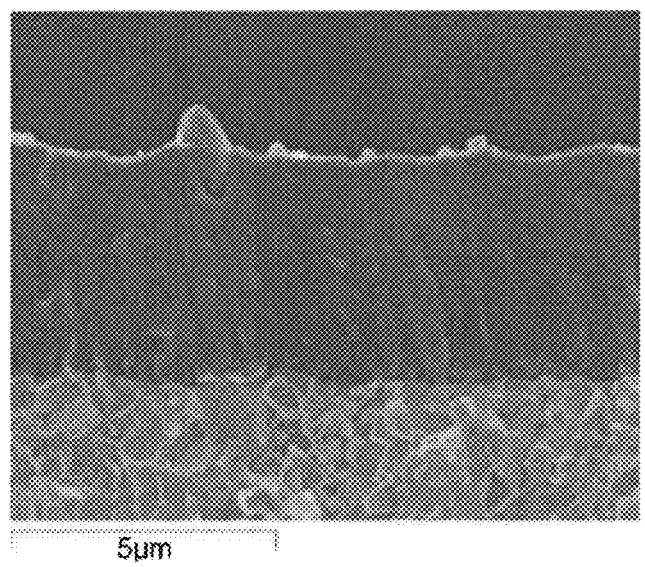
FIG. 2 is a cross-sectional photomicrograph (with a 5 micrometer scale) of the fracture surface of a (Ti57.3 at % Al38.3 at % Y4.4 at %)N coating layer with a titanium nitride bonding layer between the Ti—Al—Y—N coating layer and the substrate.

FIG. 2 is a cross-sectional photomicrograph (with a 5 micrometer scale) of the fracture surface of a (Ti57.3 at % Al38.3 at % Y4.4 at %)N coating layer with a titanium nitride bonding layer between the Ti—Al—Y—N coating layer and the substrate. It is apparent from this photomicrograph that the Ti—Al—Y—N coating layer has a reduced grain size. The reduction in grain size results in a increase in the hardness, which is a desirable property for wear applications. Of course, there should also be an appreciation that higher hardness is desirable for metal forming applications and tribological applications to extend the useful life of wear parts.

Figure 3:
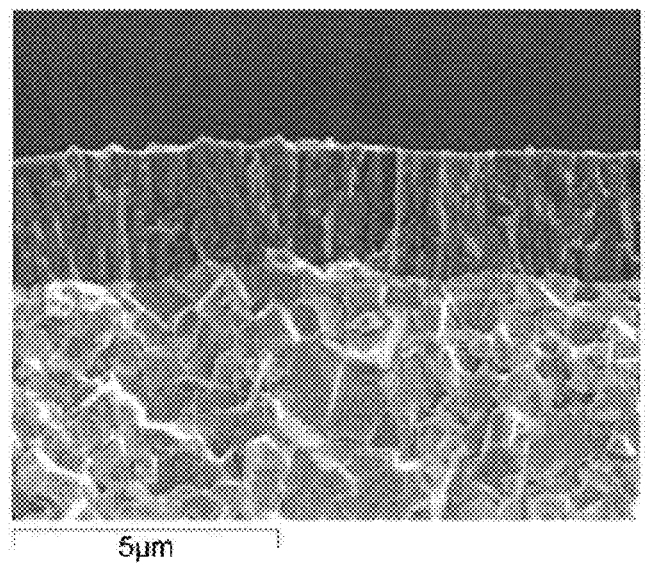
FIG. 3 is a cross-sectional photomicrograph (with a 5 micrometer scale) of the fracture surface of a (Ti55 at % Al45 at %)N coating layer, which is not an inventive coating scheme.

The grain size as shown in FIG. 2 is in contrast to the grain size of a Ti—Al—N coating layer as shown in FIG. 3. In this regard, FIG. 3 is a cross-sectional photomicrograph (with a 5 micrometer scale) of the fracture surface of a (Ti55 at % Al45 at %)N coating layer. The grain size of the Ti—Al—N coating layer of FIG. 3 is larger than the grain size of the Ti—Al—Y—N coating layer of FIG. 2. The larger grain size in the PVD coating region of FIG. 2 would not be expected to provide as high hardness as the smaller grain size in the coating show in FIG. 2.

Figure 4:
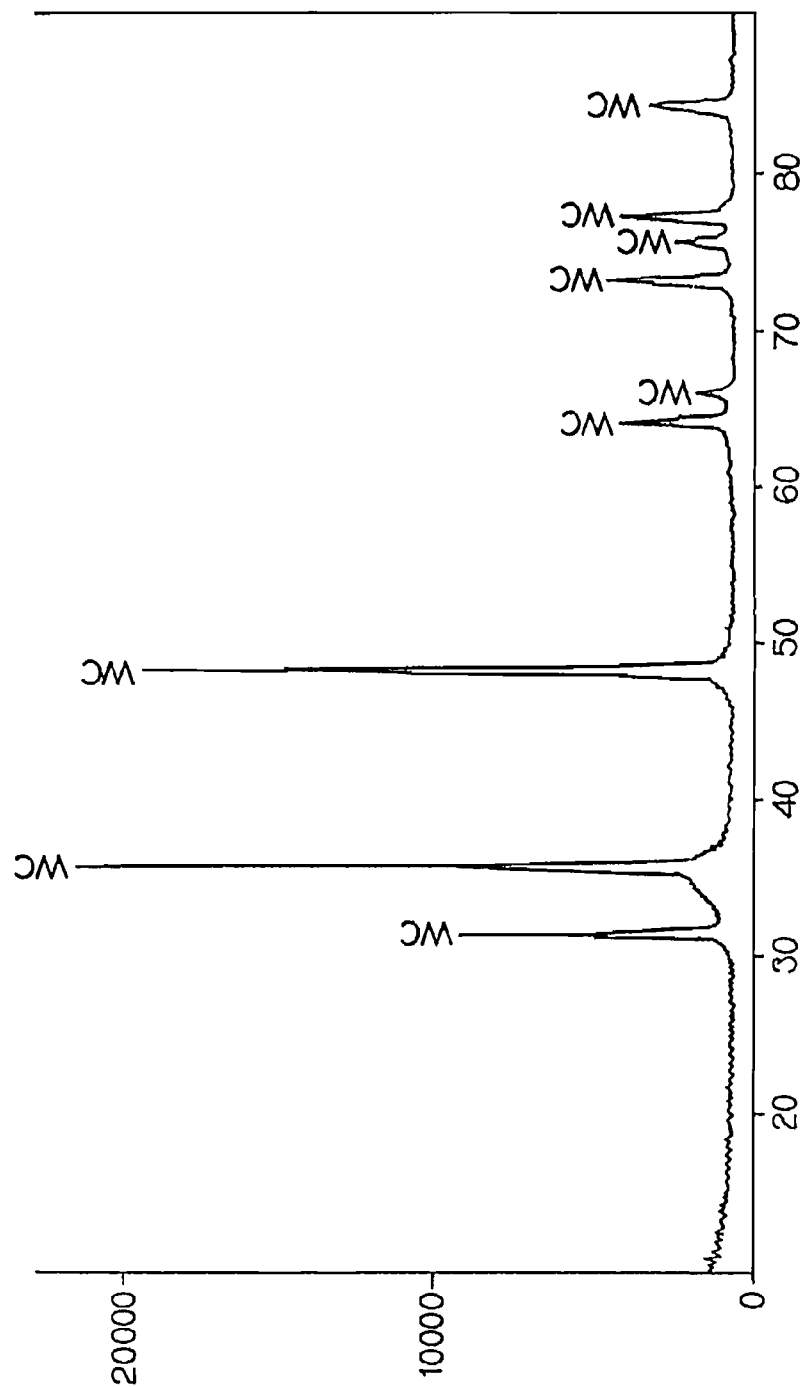
FIG. 4 is an x-ray diffraction (XRD) spectrum showing the coating and substrate of a (Ti33.2 at % Al59 at % Y7.8 at %)N coating layer wherein the coating layer has an amorphous structure.
Figure 5:
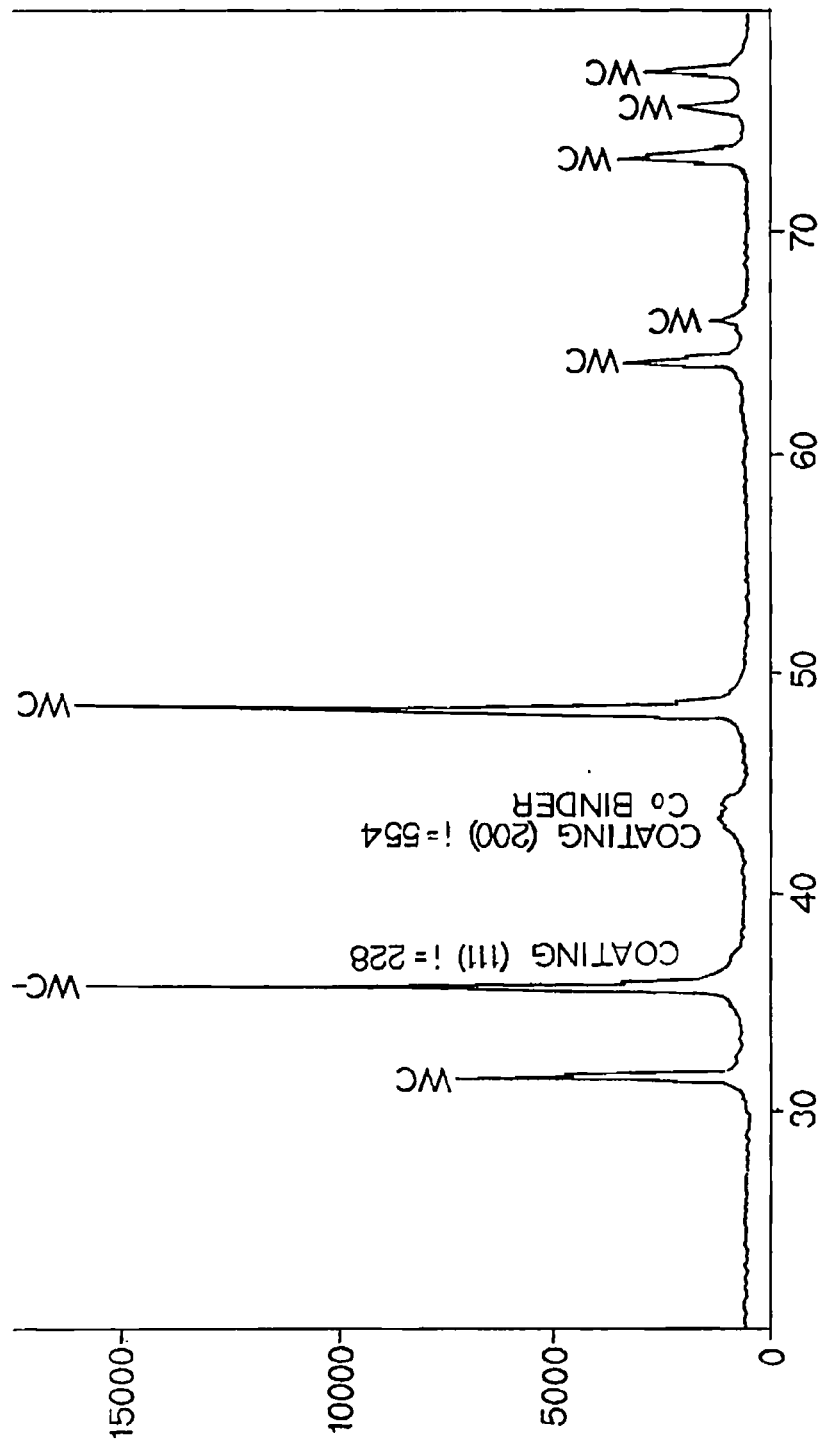
FIG. 5 is an x-ray diffraction (XRD) spectrum showing the coating and substrate of a (Ti37 at % Al63 at %)N coating layer with an estimated grain size equal to 15 nanometers, and this coating is not an inventive coating.

As mentioned above, the addition of yttrium to a coating with a high aluminum content i.e., an aluminum content greater than about 60 to about 65 atomic percent of the other elements, except for nitrogen, can lead to an amorphous microstructure. In this regard, FIG. 4 is an x-ray diffraction (XRD) spectrum showing the coating and substrate of a (Ti33.2 at % Al59 at % Y7.8 at %)N coating layer wherein the coating layer has an amorphous structure. In FIG. 4, the substrate is cemented carbide. This is in contrast to the grain size of a Ti—Al—N coating layer such as shown by FIG. 5. FIG. 5 is an x-ray diffraction (XRD) spectrum showing the coating and substrate of a (Ti37 at % Al63 at %)N coating layer with an estimated grain size equal to 15 nanometers. In FIG. 5, the substrate is tungsten carbide with a cobalt binder.

A number of examples were prepared using PVD techniques to apply the PVD coating region as a part of the coating scheme on the substrate. The PVD coating region was deposited using the cathodic arc plasma-assisted PVD method within the following parameters. The deposition temperatures ranged between about 400° C. and about 600° C. The PVD coating region was applied in a nitrogen atmosphere wherein the nitrogen pressure ranged between about 1E-2 to 5E-2 ($1 \times 10^{-2}$ to $5 \times 10^{-2}$) mbar (millibars). The substrate biasing ranged between about −40 Volts to about −100 Volts.

The specific examples and some of the properties are set forth below in the following Table A through Table C. The compositions are set forth in atomic percent of the elements present in the PVD coating region, except for the nitrogen. In Table, A, the hardness and Young's Modulus are set forth in GPa (gigapascals) and were measured by the nanoindentation technique per ISO 14577-1:2002 standard procedure entitled Metallic Materials—Instrumented Indentation Test for Hardness and Material Parameters—Part 1 Test Method. The indentation depth was set at 0.25 microns.

TABLE A

Composition and Selected Properties of Single Layer Coatings

| Example | Coating Name | Ti (at. %) | Al (at. %) | Y (at. %) | Al + Y (at. %) | Hardness (GPa) | Young's Modulus (GPa) | Thickness (micrometers) |
|---|---|---|---|---|---|---|---|---|
| IN #51 | TiAlYN | 57.3 | 38.3 | 4.4 | 42.7 | 32.4 | 459 | 3.4 |
| R #206 | AlTiYN | 33.2 | 59 | 7.8 | 66.8 | 22.6 | 277 | 4.2 |
| R #94 | AlCrYN | Cr = 34.3 Ti = 0 | 58.4 | 7.3 | 65.7 | 26.5 | 401 | 3.9 |

Table A sets forth data about examples wherein the PVD coating region comprises a single coating layer.

TABLE B

Composition and Selected Properties of Multi-Layer Coatings

| Example | Coating Name | Ti (at. %) | Al (at. %) | Y (at. %) | Al + Y (at. %) | Hardness (GPa) | Young's Modulus (GPa) | Thickness (micrometers) |
|---|---|---|---|---|---|---|---|---|
| IN #67 | TiAlYN | 60.2 | 35.7 | 4.1 | 39.8 | 32 | 473 | 4.2 |
| IN #99 | TiAlYN | 56.4 | 39.6 | 4 | 43.6 | 34.1 | 483 | 4.3 |
| IN #135 | TiAlYN | 92.7 | 6.5 | 0.8 | 7.3 | 30.6 | 515 | 4.8 |
| IN #100 | AlTiYN | 92 | 7 | 1 | 8 | 31.1 | 497 | 3.7 |
| IN #115 | 2AlTiYN | 93.2 | 5.9 | 0.8 | 6.7 | 30.6 | 494 | 4.9 |
| IN #101 | AlTiYN | 89.9 | 8.9 | 1.2 | 10.1 | 31.8 | 489 | 4.0 |
| IN #103 | AlTiYN | 86.1 | 12.3 | 1.6 | 13.9 | 33 | 456 | 4.7 |
| IN #87 | TiAlSiYN | 62.8 Si = 3.4 | 31.1 | 2.6 | 33.7 | 34.6 | 466 | 4.0 |

TABLE B-continued

Composition and Selected Properties of Multi-Layer Coatings

| Example | Coating Name | Ti (at. %) | Al (at. %) | Y (at. %) | Al + Y (at. %) | Hardness (GPa) | Young's Modulus (GPa) | Thickness (micrometers) |
|---|---|---|---|---|---|---|---|---|
| R #214 | TiAlCrYN | Ti = 12.9<br>Cr = 27.8 | 53.9 | 5.4 | 59.3 | 30.1 | 512 | 4.3 |

Figure 9:
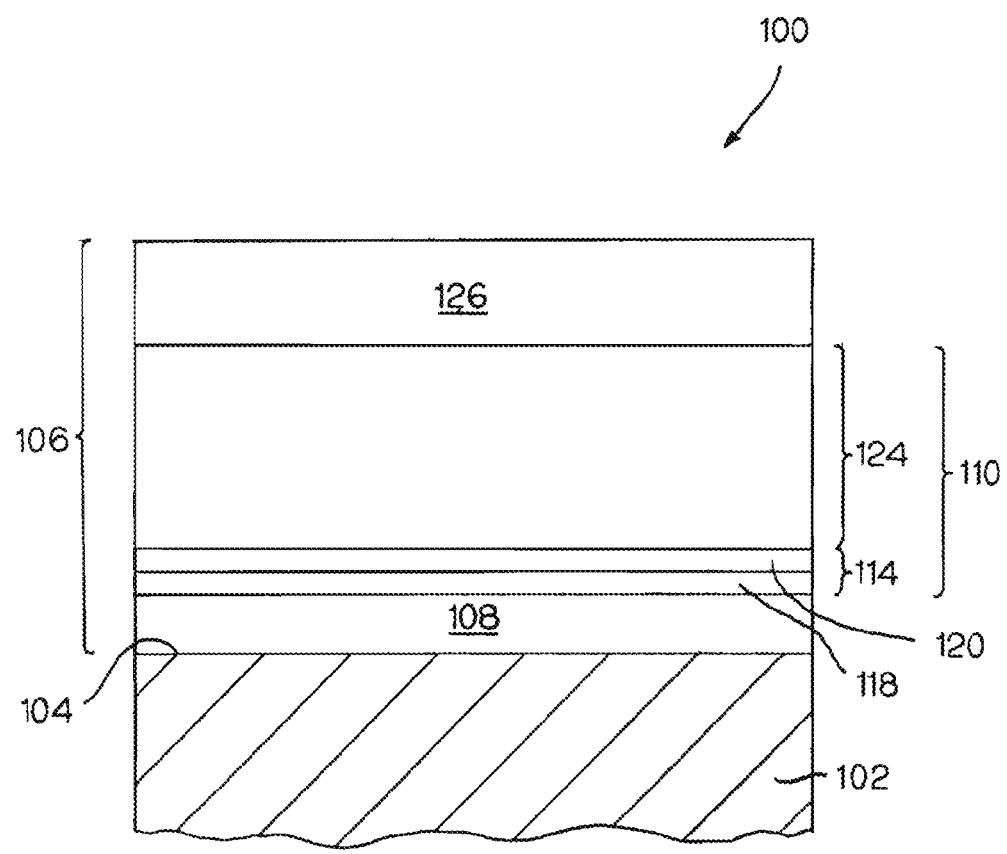
FIG. 9 is a schematic view of the coating scheme of Example IN #67.

Table B sets forth data about examples wherein the PVD coating region comprises multiple coating layers. In reference to FIG. 9, this drawing is a schematic drawing that shows the coating scheme of the coated cutting insert designated as Example IN #67 in Table B. The cutting insert is generally designated as 100. Cutting insert 100 has a substrate 102, which has a surface 104, and a coating scheme (bracket 106) on the surface 104. The coating scheme 106 contains a base coating layer 108 of titanium nitride. A coating region shown by bracket 110 is on top of the base coating layer 108. The coating region 110 comprises fourteen sets of alternating coating layers (see bracket 114 for each set). Each set 114 comprises a first coating layer of titanium-aluminum-yttrium and nitrogen 118 and a second coating layer of titanium-aluminum-yttrium and nitrogen 120, which has a higher titanium content. The balance (see bracket 124) of the coating region 110 comprises thirteen sets of alternating coating layers (118, 120). The coating scheme 106 has a top coating layer 126 comprising titanium-aluminum-yttrium and nitrogen, which is on the outermost coating layer of the coating region 110.

coating scheme, which was a standard coating scheme provided by Kennametal Inc. of Latrobe, Pa. 15650 under the designation "VF". The cutting conditions/parameters are as follows: machining operation was turning; the cutting insert style was SNMA120408; the workpiece material was 4140 steel; the speed was 660 sfm (surface feet per minute) [201.17 surface meters per minute], the feed in inches per revolution (ipr) was 0.012 ipr [0.031 centimeters per revolution], and the depth of cut was 0.06 inches (1.5 millimeters). The failure mode for the turning was crater wear equal to 0.004 inches (0.1 millimeters).

Figure 7:
FIG. 7 is a photograph showing the crater wear on an inventive TiN/TiAlYN coated cutting tool.
Figure 8:
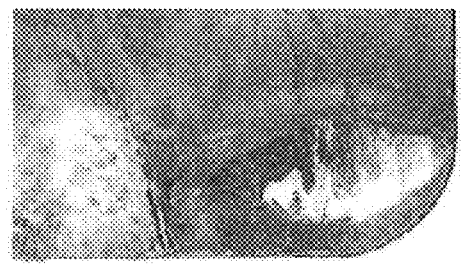
FIG. 8 is a photograph showing the crater wear on a TiN/TiAlN coated cutting tool wherein this coating scheme is not an inventive coating.

In reference to the results, the tool life for the conventional coated cutting inset with a TiN/TiAlN coating scheme was equal to 16.8 minutes. The tool life for the inventive coated cutting insert with a TiN/TiAlYN coating scheme was equal to 26.6 minutes. Further, FIG. 7 is a photograph showing the crater wear on the TiN/TiAlYN coated cutting insert. FIG. 8 is a photograph showing the crater wear of the TiN/TiAlN coated cutting insert. It is apparent from a visual inspection of FIGS. 7 and 8 that the inventive TiN/TiAlYN coated cutting insert experiences less crater wear than does the conventional TiN/TiAlN coated cutting insert.

TABLE C

Composition and Selected Properties of Nanolayer Coatings

| Example | Coating Name | Ti (at. %) | Al (at. %) | Y (at. %) | Al + Y (at. %) | Hardness (GPa) | Young's Modulus (GPa) | Thickness (micrometers) |
|---|---|---|---|---|---|---|---|---|
| IN #113 | TiAlYN | 91.8 | 7.4 | 0.8 | 8.2 | 28 | 486 | 4.6 |
| IN #114 | TiAlYN | 86.5 | 11.9 | 1.6 | 13.5 | 31.6 | 512 | 4.1 |
| IN #116 | AlTiYN | 90.9 | 8.1 | 1 | 9.1 | 31.4 | 505 | 5.1 |
| IN #117 | AlTiYN | 84 | 14.1 | 1.9 | 16 | 30.9 | 501 | 3.2 |
| IN #104 | AlTiYN | 74.1 | 23.2 | 2.7 | 25.9 | 33.8 | 482 | 5.3 |
| IN #105 | AlTiYN | 74.5 | 24 | 1.5 | 25.5 | 31.7 | 461 | 5.3 |
| IN #106 | AlTiYN | 46.5 | 50.3 | 3.2 | 53.5 | 27 | 337 | 4 |
| R #259 | AlTiYN | 45.8 | 50.8 | 3.4 | 54.2 | 28 | 424 | 2.9 |
| R #265 | AlTiYN | 51.8 | 46.9 | 1.3 | 48.2 | 31.3 | 521 | 3.8 |

Table C sets forth data about examples wherein the PVD coating region comprises nanolayers.

Figure 6:
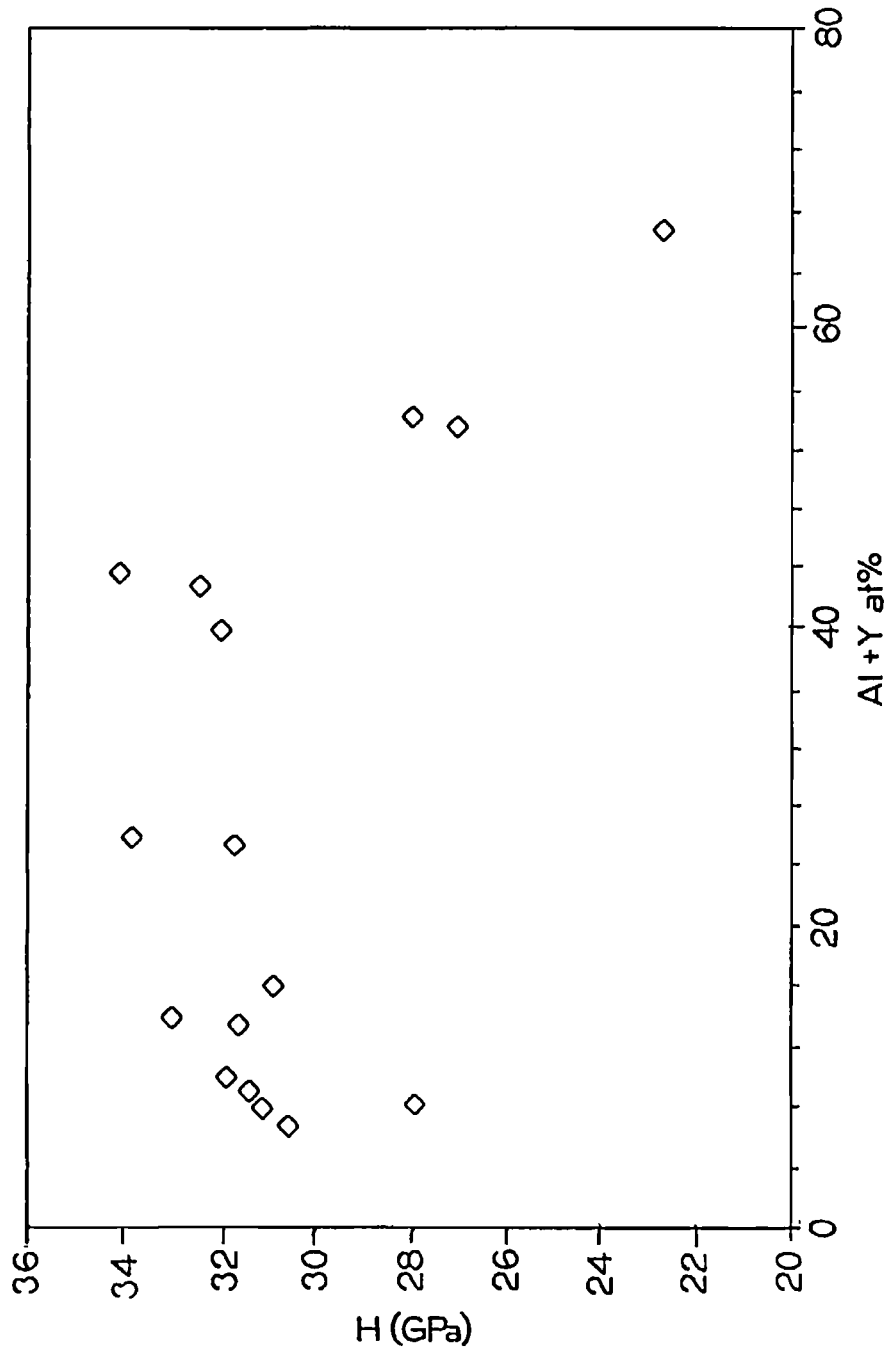
FIG. 6 is a plot showing the hardness (GPa) and the sum of the aluminum and yttrium contents (in atomic percentage of the elements, except for nitrogen) for the Ti—Al—Y—N coating layers.

FIG. 6 is a plot showing the hardness (GPa) and the sum of the aluminum and yttrium contents atomic percentage) for the Ti—Al—Y—N coating layers. As is apparent from the plot, there exists a range of the Al+Y fraction where the hardness of the coating is maximized.

Cutting tests were performed to evaluate the cutting performance of coated cutting inserts that have a coating scheme including the yttrium-containing coating layers. An inventive coated cutting insert with a coating scheme containing a TiN/TiAlYN was compared against a conventional coated cutting insert with a TiN/TiAlN coating scheme. The conventional coated cutting insert had a multilayer TiN—TiAlN Further metal cutting tests were performed wherein inventive coated cutting inserts were compared against conventional coated cutting inserts. The conventional coated cutting insert had a multilayer TiN—TiAlN coating scheme, which was a standard coating scheme provided by Kennametal Inc. of Latrobe, Pa. 15650 under the designation "VF". The cutting conditions/parameters are as follows: machining operation was turning; the cutting insert style was SNMA 120408; the workpiece material was 4140 steel; the speed was 660 sfm (surface feet per minute) [201.17 surface meters per minute], the feed in inches per revolution (ipr) was 0.012 ipr [0.031 centimeters per revolution], and the depth of cut was 0.06 inches (1.5 millimeters). The failure mode for the turning was crater wear equal to 0.004 inches (0.1 millimeters).

Table D below sets forth the test results.

TABLE D

Comparison of Conventional Coated Cutting Inserts Against Inventive Coated Cutting Inserts

| Example | Tool Life (minutes) |
|---|---|
| Conventional TiN/TiAlN | 14.5 |
| Conventional AlTiN | 12.5 |
| IN #134 | 24.4 |
| IN #135 | 22.2 |
| IN #136 | 22.3 |
| IN #137 | 12.7 |

TABLE E

Composition and Selected Properties of Nanolayer Coatings

| Example | Hardness (GPa) | Young's Modulus (GPa) | Thickness (micrometer) |
|---|---|---|---|
| IN #134 | 30.9 | 481 | 5 |
| IN #135 | 30.6 | 515 | 4.8 |
| IN #136 | 33 | 478 | 5 |
| IN #137 | 34.3 | 478 | 3.6 |

The composition of the coating for Examples IN#134 through IN#137 contains titanium, aluminum, yttrium and nitrogen. The sum of the titanium, aluminum and yttrium contents equals 100 atomic percent. The sum of the aluminum and yttrium contents (in atomic percent) is between about 3 atomic percent and about 55 atomic percent of the sum (in atomic percent) of the aluminum, the yttrium and the titanium contents (in atomic percent). The yttrium content (in atomic percent) is between about 0.5 atomic percent and about 5 atomic percent of the sum of the aluminum, the yttrium and the titanium contents (in atomic percent).

It is apparent from looking at Table D, that most of the inventive coated cutting inserts, which have a coating that contains yttrium, display dramatic improved tool life over the conventional coated cutting inserts, which have coatings that do not contain yttrium.

It is apparent from the above description that the present invention provides a coated article that has a hard coating that exhibits improved properties wherein the coated article is useful in wear-resistant applications such as, for example, metal cutting, metal forming, and tribological applications to extend the useful life of wear parts. It is apparent from the above description that the present invention provides such a coated article that has a hard coating applied by physical vapor deposition that exhibits such improved properties.

It is apparent from the above description that the present invention provides such a coated article that has a PVD coating region that exhibits improved properties (e.g., a higher hardness) and wherein the PVD coating region contains aluminum and yttrium and nitrogen and at least one element selected from the group of titanium, zirconium, hafnium, vanadium, niobium, tantalum, chromium, molybdenum, tungsten and silicon. It is apparent from the above description that the present invention provides such a coated article that has a PVD coating region that exhibits improved properties (e.g., a smaller grain size) and wherein the PVD coating region contains aluminum and yttrium and nitrogen and at least one element selected from the group of titanium, zirconium, hafnium, vanadium, niobium, tantalum, chromium, molybdenum, tungsten and silicon. It is apparent from the above description that the present invention provides such a coated article that has a PVD coating region that exhibits improved properties and wherein the PVD coating region contains aluminum and yttrium and nitrogen and at least one element selected from the group of titanium, zirconium, hafnium, vanadium, niobium, tantalum, chromium, molybdenum, tungsten and silicon.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A coated article comprising:
   a substrate;
   a coating scheme;
   the coating scheme comprising a PVD coating region applied by physical vapor deposition wherein the coating region consisting of aluminum, yttrium, titanium and nitrogen; and
   wherein the sum of the aluminum and yttrium contents being between about 3 atomic percent and about 45 atomic percent of the sum of the aluminum, the yttrium and the titanium, and the yttrium content being between about 0.5 atomic percent and about 5 atomic percent of the sum of the aluminum, the yttrium and the titanium, and the aluminum content being greater than the yttrium content.

2. A coated article comprising:
   a substrate;
   a coating scheme;
   the coating scheme comprising a PVD coating region applied by physical vapor deposition wherein the coating region containing titanium and aluminum and yttrium and nitrogen and optionally one or more elements selected from the group consisting of zirconium, hafnium, vanadium, niobium, tantalum, chromium, molybdenum, tungsten and silicon; and
   wherein the sum of the aluminum and yttrium contents being between about 25 atomic percent and about 45 atomic percent of the sum of the titanium, the aluminum, the yttrium and the other elements; the yttrium content being between about 0.5 atomic percent and about 5 atomic percent of the sum of the titanium, the aluminum, the yttrium and the other elements; the titanium content being greater than the content of any one of the aluminum, the yttrium and the other elements; and the PVD coating region having a hardness greater than or equal to about 27 GPa as measured by a nanoindentation technique per ISO 14577-1:2002 standard procedure with an indentation depth equal to 0.25 microns.

3. The coated article according to claim 2 wherein yttrium content being between about 1.5 atomic percent and about 4.5 atomic percent of the sum of the aluminum, the yttrium and the other elements; and the PVD coating region having a hardness greater than or equal to about 32 GPa as measured by a nanoindentation technique per ISO 14577-1:2002 standard procedure with an indentation depth equal to 0.25 microns.

4. The coated article according to claim 2 wherein the sum of the aluminum and yttrium contents being between about 32 atomic percent and about 45 atomic percent of the sum of the aluminum, the yttrium and the other elements; and the PVD coating region having a hardness greater than or equal to about 34 GPa as measured by a nanoindentation technique per ISO 14577-1:2002 standard procedure with an indentation depth equal to 0.25 microns.

5. The coated article according to claim 4 wherein yttrium content being between about 2.5 atomic percent and about 4.0 atomic percent of the sum of the aluminum, the yttrium and the other elements; and the PVD coating region having a hardness greater than or equal to about 34 GPa as measured by a nanoindentation technique per ISO 14577-1:2002 standard procedure with an indentation depth equal to 0.25 microns.

6. The coated article according to claim 2 wherein the titanium being between about 45 atomic percent and about 95 atomic percent of the sum of the aluminum, the yttrium and the other elements.

7. The coated article according to claim 6 wherein the titanium being between about 55 atomic percent and about 87 atomic percent of the sum of the aluminum, the yttrium and the other elements; and the PVD coating region having a hardness greater than or equal to about 34 GPa as measured by a nanoindentation technique per ISO 14577-1:2002 standard procedure with an indentation depth equal to 0.25 microns.

8. The coated article according to claim 6 wherein the other element further comprising either chromium or silicon; and when the other element being chromium, the chromium being between about 25 atomic percent and about 40 atomic percent of the sum of the aluminum, the yttrium, the titanium and the chromium, and when the other element being silicon, the silicon being between about 2 atomic percent and about 5 atomic percent of the sum of the aluminum, the yttrium, the titanium and the silicon.

9. The coated article according to claim 8 wherein the silicon being between about 3 atomic percent and about 4 atomic percent of the sum of the aluminum, the yttrium, the titanium and the silicon; the titanium being between about 60 atomic percent and about 65 atomic percent of the sum of the aluminum, the yttrium, the titanium and the silicon; the yttrium being between about 2 atomic percent and about 3 atomic percent of the sum of the aluminum, the yttrium, the titanium and the silicon; and the sum of the aluminum and yttrium being between about 30 atomic percent and about 35 atomic percent of the sum of the aluminum, the yttrium, the titanium and the silicon.

10. The coated article according to claim 2 wherein the other element comprising chromium, and wherein the chromium being between about 25 atomic percent and about 45 atomic percent of the sum of the aluminum, the yttrium and the other elements.

11. The coated article according to claim 2 wherein the coating region having a hardness ranging between about 30 GPa and about 35 GPa as measured by a nanoindentation technique per ISO 14577-1:2002 standard procedure with an indentation depth equal to 0.25 microns, and the coated article having a Young's Modulus between about 450 GPa and about 525 GPa as measured by a nanoindentation technique per ISO 14577-1:2002 standard procedure with an indentation depth equal to 0.25 microns.

12. The coated article according to claim 2 wherein the PVD coating region comprising a single coating layer comprising titanium, aluminum, yttrium and nitrogen; and the titanium being between about 45 atomic percent and about 95 atomic percent of the sum of the aluminum, the yttrium, and the titanium; the yttrium being between about 0.5 atomic percent and about 4 atomic percent of the sum of the aluminum, the yttrium and the titanium; and the sum of the aluminum and yttrium being between about 7 atomic percent and about 50 atomic percent of the sum of the aluminum, the yttrium, and the titanium; and the PVD coating region having a hardness greater than or equal to about 32 GPa as measured by a nanoindentation technique per ISO 14577-1:2002 standard procedure with an indentation depth equal to 0.25 microns.

13. The coated article according to claim 2 wherein the coating region comprising multiple coating layers comprising titanium, aluminum, yttrium and nitrogen; and the titanium being between about 45 atomic percent and about 95 atomic percent of the sum of the aluminum, the yttrium, and the titanium; the yttrium being between about 0.5 atomic percent and about 4.5 atomic percent of the sum of the aluminum, the yttrium and the titanium; and the sum of the aluminum and yttrium being between about 6 atomic percent and about 45 atomic percent of the sum of the aluminum, the yttrium, and the titanium; and the PVD coating region having a hardness greater than or equal to about 30 GPa as measured by a nanoindentation technique per ISO 14577-1:2002 standard procedure with an indentation depth equal to 0.25 microns.

14. The coated article according to claim 2 wherein the coating region comprising a plurality of nanolayers comprising titanium, aluminum, yttrium and nitrogen; and the titanium being between about 45 atomic percent and about 95 atomic percent of the sum of the aluminum, the yttrium, and the titanium; the yttrium being between about 0.5 atomic percent and about 4 atomic percent of the sum of the aluminum, the yttrium and the titanium; and the sum of the aluminum and yttrium being between about 7 atomic percent and about 50 atomic percent of the sum of the aluminum, the yttrium, and the titanium; and the PVD coating region having a hardness greater than or equal to about 27 GPa as measured by a nanoindentation technique per ISO 14577-1:2002 standard procedure with an indentation depth equal to 0.25 microns.

15. A coated article comprising:
   a substrate;
   a coating scheme;
   the coating scheme comprising a PVD coating region applied by physical vapor deposition wherein the coating region containing titanium and aluminum and yttrium and nitrogen and optionally one or more elements selected from the group consisting of zirconium, hafnium, vanadium, niobium, tantalum, chromium, molybdenum, tungsten and silicon; and
   wherein the sum of the aluminum and yttrium contents being between about 10 atomic percent and about 15 atomic percent of the sum of the aluminum, the yttrium, the titanium, and the other elements; and the PVD coating region having a hardness greater than or equal to about 33 GPa as measured by a nanoindentation technique per ISO 14577-1:2002 standard procedure with an indentation depth equal to 0.25 microns.

* * * * *